United States Patent [19]

Kaplan et al.

[11] Patent Number: 4,531,208

[45] Date of Patent: Jul. 23, 1985

[54] APPARATUS AND METHOD FOR REDUCING TELEPHONE CHANNEL POWER LOADING

[75] Inventors: Gerald S. Kaplan, Princeton; Russell G. Setzer, Hazlet, both of N.J.

[73] Assignee: RCA Corporation, Princeton, N.J.

[21] Appl. No.: 351,999

[22] Filed: Feb. 24, 1982

[51] Int. Cl.³ ............................. H04B 1/00; H04J 3/18
[52] U.S. Cl. .......................................... 370/7; 370/74; 455/72
[58] Field of Search ............... 370/7, 74; 455/72; 179/170.2; 333/14

[56] References Cited

U.S. PATENT DOCUMENTS

| | | | |
|---|---|---|---|
| 2,795,650 | 6/1957 | Levine | 455/72 |
| 3,151,296 | 9/1964 | Phyfe | 325/141 |
| 3,170,994 | 2/1965 | Benewicz | 179/170.2 |
| 3,176,224 | 3/1965 | Lampke | 325/38 |
| 3,504,115 | 3/1970 | Suzuki et al. | 455/72 |
| 3,667,047 | 5/1972 | Iwasaki et al. | 455/72 |
| 3,750,022 | 7/1973 | Curry et al. | 455/5 |
| 3,827,052 | 7/1974 | Tanaka | 455/72 |
| 3,943,466 | 3/1976 | Lyghounis | 333/14 |
| 4,034,295 | 7/1977 | Kotezawa et al. | 455/72 |
| 4,314,372 | 2/1982 | Bakgaard | 455/68 |

FOREIGN PATENT DOCUMENTS 2644600 4/1977 Fed. Rep. of Germany .

*Primary Examiner*—Douglas W. Olms
*Assistant Examiner*—Frank M. Scotch, III
*Attorney, Agent, or Firm*—Joseph S. Tripoli; Robert L. Troike; Christopher Lyle Maginniss

[57] ABSTRACT

Conventional telephone systems including terminal equipments interconnected by a communications channel typically employ a supervisory tone transmitted by each terminal equipment to indicate its idle condition. Because the fraction of idle terminal equipments may be high, the total energy carried over the channel is substantially determined by these tones. The apparatus of the type disclosed herein, employed in association with each terminal equipment, effects a reduction in the channel power loading due to those tones. The apparatus includes circuits for detecting the presence of the idle state supervisory tone being transmitted from or received by the associated terminal. If the tone is present on either the transmit or received lead, the signal transmitted by the terminal into the channel is attenuated by a fixed power ratio and the signal received by the terminal from the channel is amplified by the same fixed power ratio.

5 Claims, 6 Drawing Figures

APPARATUS AND METHOD FOR REDUCING TELEPHONE CHANNEL POWER LOADING

This invention relates to radio transmission of voice communications and, more particularly, to an apparatus and method for reducing the channel power loading in a telephone communications system.

In the area of radio transmission of multi-channel voice and data communications, whether relayed by satellite or via terrestrial microwave links, it is always a design objective to utilize the transponders as efficiently as possible, so as to maximize the number of channels available for information transfer. This is especially true in the area of telephone communications which is experiencing an ever-increasing traffic load on existing equipment.

It is known that in FM communications the level of the modulating signal is directly related to the bandwidth required on a carrier. Hence, techniques which allow a reduction in the overall level of the modulating signal permit the use of a smaller carrier bandwidth or, alternatively, an expanded frequency range of the modulating signal for the same carrier bandwidth. By exploiting the advantages of compandors inserted at the terminal ends of each channel, a considerable increase in channel capacity, relative to conventional practice, has been experienced. Compandors permit a reduction in the level of the signal transmitted through the communications channel, thereby permitting an increase in the number of channels for the same carrier bandwidth.

The vast majority of private leased channels (PLC) carried over satellite links share a number of common features or characteristics. These include the use of single frequency (SF) tones for signaling and for providing supervisory functions over the satellite channel. Characteristically, a single frequency tone is transmitted when the channel is idle. Recent studies of PLC traffic patterns indicate that the percentage of channels which are idle is high, and that the total communications channel loading is significantly affected by energy corresponding to the idle telephone channel condition, i.e., the transmission of SF supervisory tones.

In accordance with one embodiment of the present invention, an apparatus is disclosed for use in a communications system in which signals are transmitted between terminals via a communications channel. Each terminal transmits a supervisory signal of predetermined power level and predetermined frequency when that terminal is idle. The disclosed apparatus reduces the power loading in the system due to the supervisory signal. The apparatus comprises means individually associated with each of the terminals for providing a control signal in response to the supervisory signal being transmitted by the associated terminal into the communications channel or received by the associated terminal from the channel. In addition, means are provided which are responsive to the control signal for attenuating the signal transmitted by the terminal into the communications channel by a predetermined power ratio and for amplifying the signal received by the terminal from the channel by the same power ratio.

Figure 3:
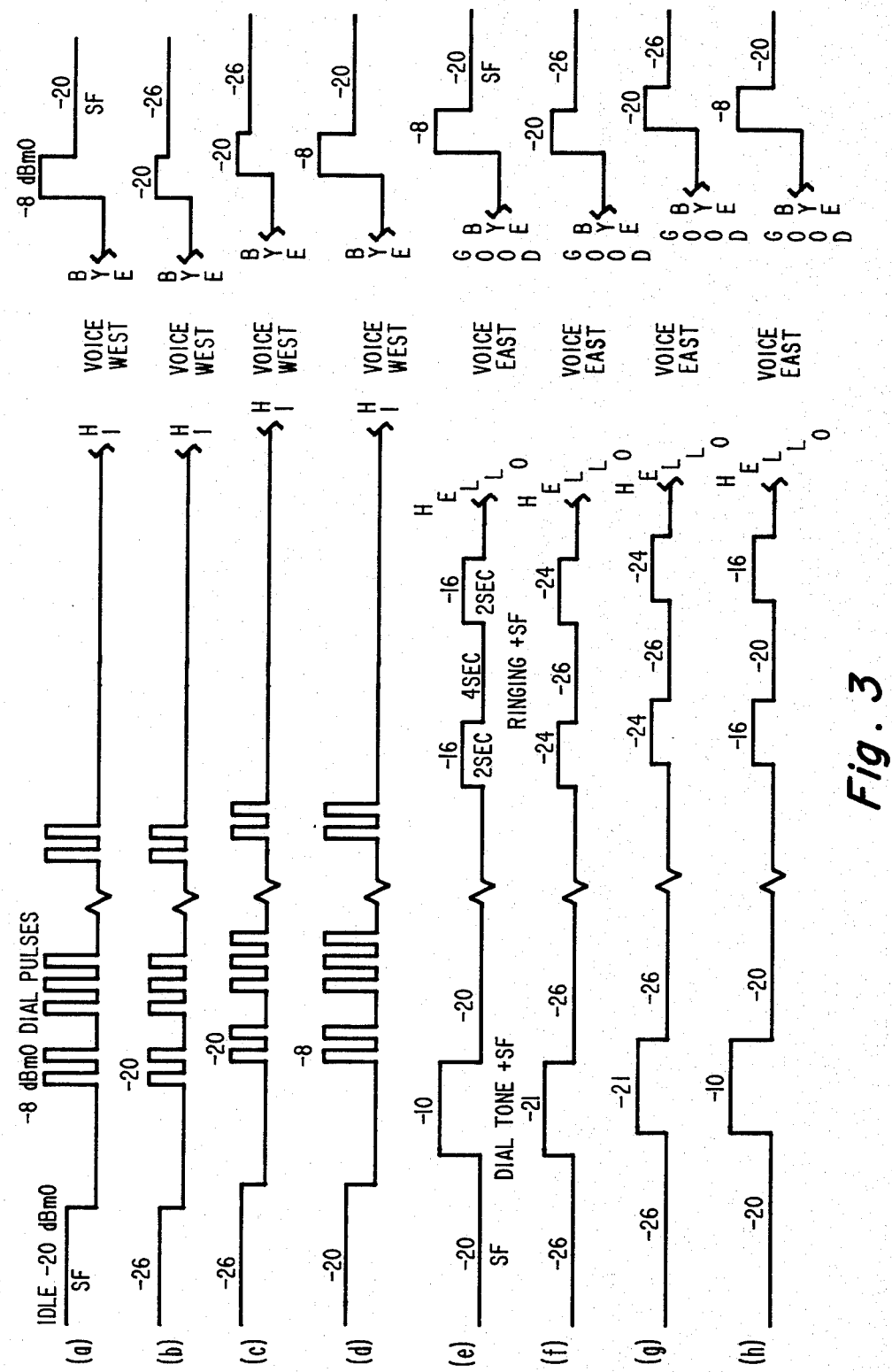
FIG. 3 is a series of timing charts showing the relative signal levels at several points along the system for a typical call sequence *absent* the present invention.
Figure 4:
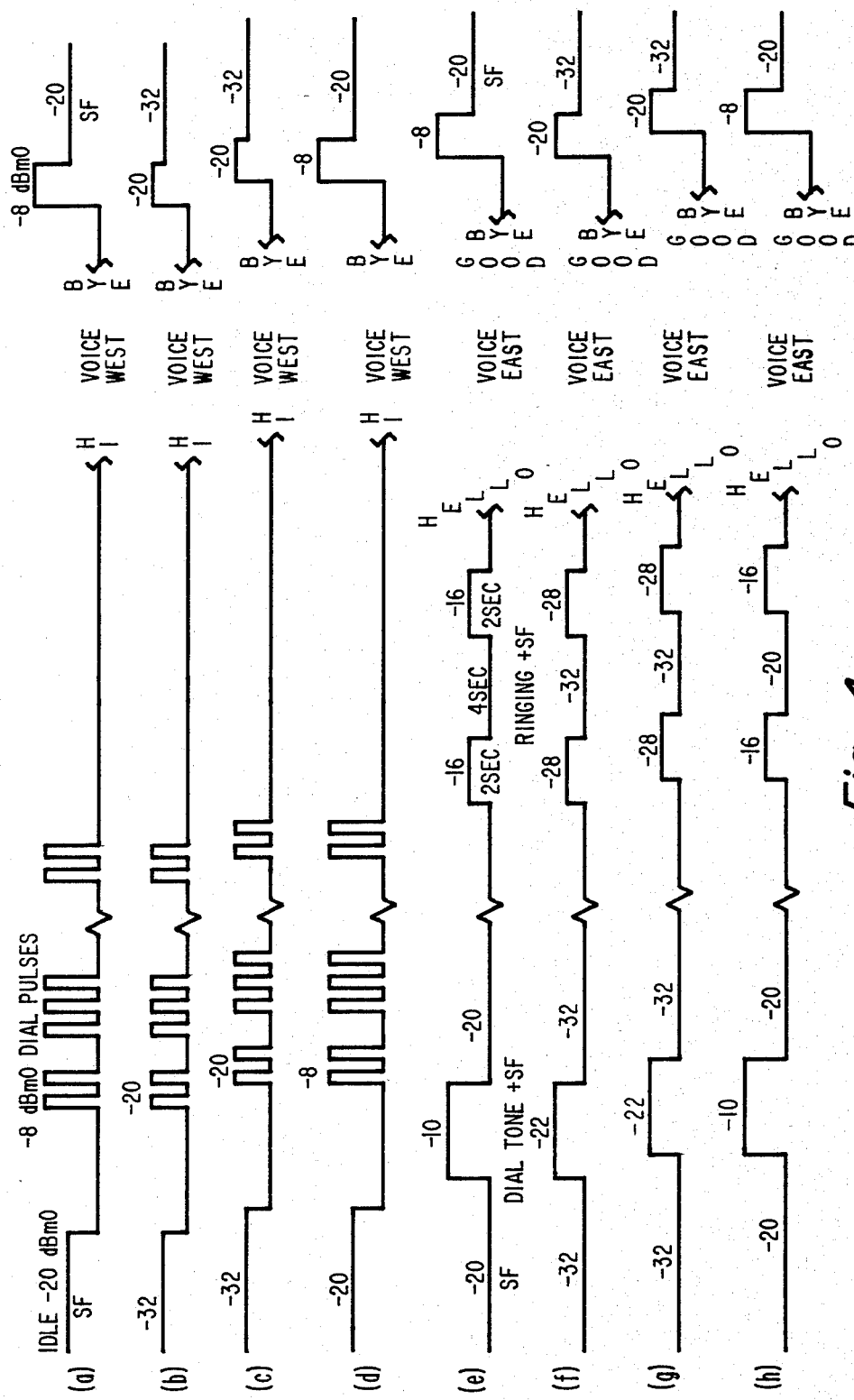
Figure 5:
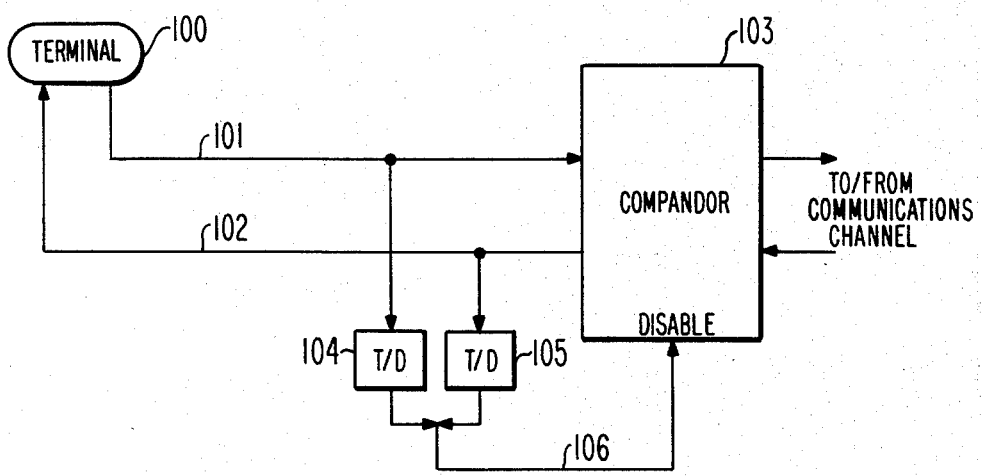
Figure 6:
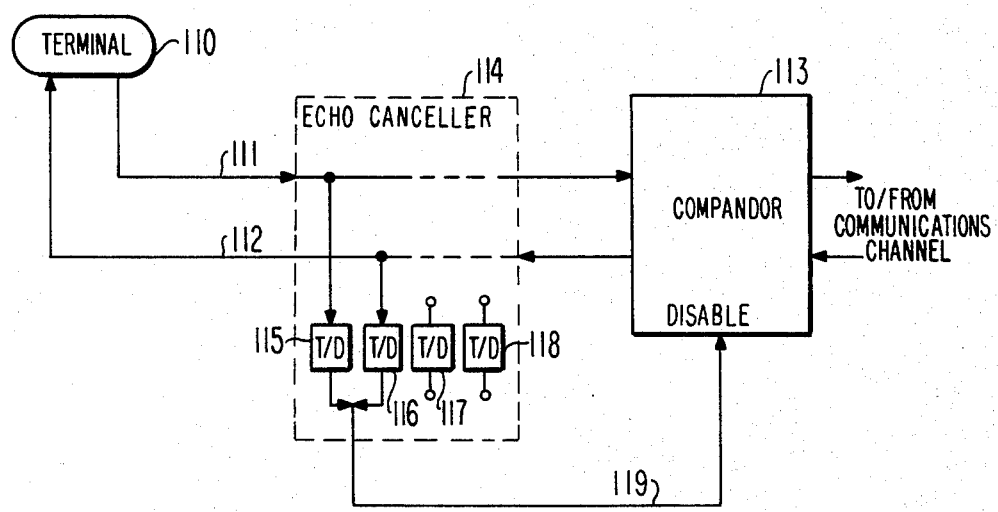

FIG. 4 repeats the timing charts of FIG. 3 for the system *including* the present invention;

FIG. 5 illustrates one embodiment of the present invention as it may be embodied in association with a conventional compandor; and FIG. 6 illustrates the embodiment of FIG. 5 further incorporating a conventional echo canceller.

Figure 1:
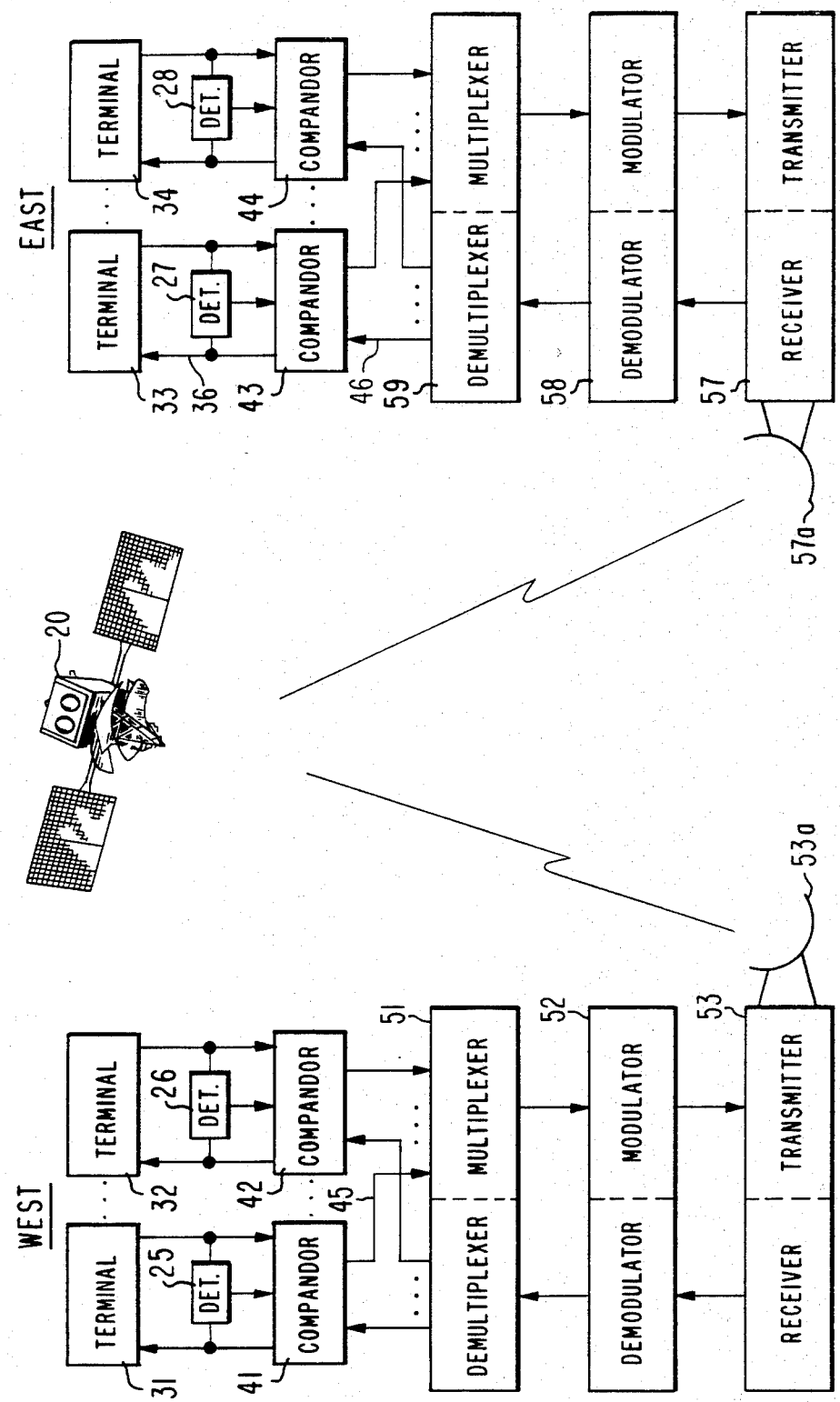
FIG. 1 is a block diagram of a communications system incorporating the present invention.

FIG. 1 depicts a satellite communications system according to one embodiment of the present invention. This disclosure will describe such a communications system handling a large number of telephone circuits interconnected by communications channels. The use of a satellite channel in the disclosed example is not a limitation, however, as the invention is equally applicable to systems employing, for example, terrestrial links.

FIG. 1 shows two communications centers designated WEST and EAST which are interconnected by their transmissions broadcast via satellite 20. Typically, telephone communications between WEST and EAST occur in the following manner: Telephone terminal 31, which may be an individual subscriber or an appearance in a commercial switching center, is one of a multiplicity of such terminals coupled into the WEST communications center. Terminal 31 is coupled to compandor 41.

Compandors are presently well-known in the art. They are non-linear devices which improve the quality of the signal transmitted via a communications channel relative to its noise content by compressing the volume range of the signal at the transmitter by a compressor and restoring the normal range at the receiving apparatus with an expander.

The compressed signal on lead 45 from compandor 41 is applied to a multiplexer 51. In addition, multiplexer 51 receives signals from a multiplicity of subscribers such as from terminal 32 via a corresponding multiplicity of compandors, such as compandor 42. Multiplexer 51 upconverts the voice signals by, in the present example, 4 KHz multiples to form a broad baseband signal. This baseband signal is applied to modulator 52 which causes a carrier signal to be amplitude or frequency modulated by the baseband signal. The output of modulator 52 is applied to transmitter 53 which, with antenna 53a, radiates RF carrier signals centered at one carrier frequency toward satellite 20. Satellite 20 picks up these RF carrier signals and relays these signals at a different carrier frequency, for example, back toward earth where they are picked up by antenna 57a and receiver 57 in the EAST communications center. The received RF carrier signals are applied to demodulator 58 which extracts the baseband signal from the carrier and applies it to demultiplexer 59 where the compound baseband signal is separated into its individual voice circuits at voice frequency range.

Each voice signal is applied to its corresponding compandor from among a large plurality of such circuits including, in the example shown, compandors 43 and 44 which, in turn, are coupled respectively to a corresponding large plurality of telephone circuits, typified by terminals 33 and 34. In the example, a demultiplexed signal is applied via lead 46 to the expander portion of the compandor 43. The restored signal is then applied to terminal 33 via lead 36, thereby completing the voice link between WEST and EAST.

It is within the system typified by FIG. 1 that the present invention finds application. Single frequency tones, applied either by the subscriber or within the communications system are used for signaling and/or supervisory functions. A vast majority of such systems employ a single frequency tone, which may be, for example, 2600 Hz, to indicate that the circuit is idle. Studies have determined that the fraction of idle circuits may be high and that under many conditions the total energy of the composite baseband signal is substantially determined by these supervisory tones. By reducing the energy of each such tone, the total energy in the baseband signal is reduced permitting either decreased bandwidth usage of the carrier or an increase in the number of channels which the carrier may accommodate for the same bandwidth, or an improvement in performance of each of the present number of channels for the same bandwidth. Additionally, it may be determined that the proper tradeoff between bandwidth reduction and increased channel capacity provides the most beneficial improvement for a particular system. It might appear obvious that reducing the level of the supervisory tones carried within the communications channel would produce the desired result. However, it must be borne in mind that the tones are supplied by and provided to telephone terminal equipment for their own use in determining channel status, signal level, etc. Any interference with the level presented at the terminal at any point during a call sequence may have a deleterious effect at the terminal end. Thus, in a system in which supervisory tones are attenuated, for the purpose of reducing the overall power level carried via a communications channel, it is of prime importance not only to restore the reduced level tones to those values normally presented at the terminals, but to reduce and restore the signal levels at such times as will not impact on any of the several types of terminal equipment.

According to the present invention, the satellite communications system would be modified using supervisory tone signal detectors, such as detectors 25, 26, 27 and 28 in FIG. 1, which, in response to supervisory tone signals, provide a control signal to the corresponding compandors to switch between compressing and expanding states and attenuating and amplifying states. A more detailed description follows in conjunction with FIG. 2.

Figure 2:
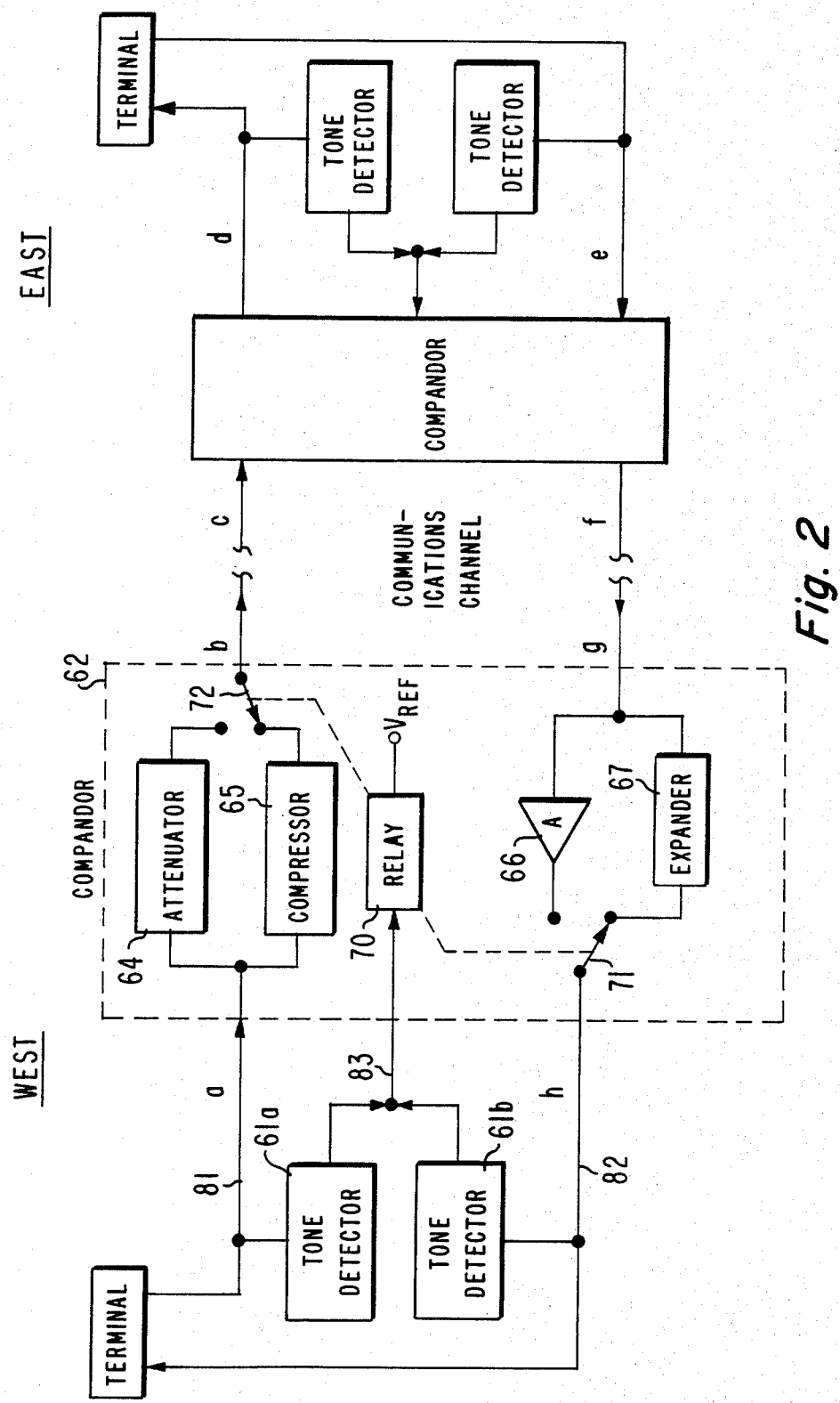
FIG. 2 illustrates functionally the apparatus for reducing power loading in FIG. 1 according to one embodiment of the present invention.

FIG. 2 illustrates, in block diagram form, one embodiment of the present invention as it may be implemented in conjunction with compandor 41 shown in FIG. 1. This implementation is merely a functional depiction useful in explaining the relative configurations of the elements of the preferred embodiment of the invention. The actual implementation would likely involve solid-state switching rather than the relay as shown in FIG. 2, and would likely incorporate the attenuating and amplifying functions, respectively, within the compressing and expanding circuits, shown separately in FIG. 2.

The invention, as embodied in FIG. 2, comprises supervisory tone detectors 61a and 61b coupled respectively to leads 81 and 82 of the signal pair. The common output of the two detectors is coupled to relay 70 via signal path 83. As shown, relay 70 includes two form C contacts 71 and 72. Contact 71 switches the path coupling the signal from the communications channel to the WEST terminal between amplifier 66 and expander 67. Contact 72 switches the path carrying the signal from the WEST terminal to the communications channel between attenuator 64 and compressor 65. Attenuator 64 reduces the signal passing through it by a fixed level which, for purposes of the present example, is 12 dB. Amplifier 66 increases signals passing through it by the same level. Relay 70 operates contacts 71 and 72 in tandem such that attenuator 64 and amplifier 66 are switched into the signal paths or compressor 65 and expander 67 are switched into the signal paths. The relaxed state of contacts 71 and 72, i.e., when relay 70 is unenergized, causes compressor 65 and expander 67 to be in the signal paths.

Frequency detectors 61a and 61b are each tuned to respond to a predetermined frequency, the frequency of the tone representing the idle condition on their respective signal lines. In the present example, frequency detectors 61a and 61b sense the signals on leads 81 and 82, respectively, and when either detects energy in excess of a threshold value at the predetermined frequency, 2600 Hz in this case, provides an enabling signal along signal path 83 to relay 70 which, in turn, causes contacts 71 and 72 to assume their energized state. It is important to note the enabling signal activates relay 70 when the designated frequency is detected on either or both of leads 81 and 82.

It is considered well within the ordinary skill of one in the art to modify the above configuration such that the signal provided by frequency detectors 61a and 61b to relay 70 along path 83 causes relay 70 to be energized only when the designated frequency is absent from both signal paths 81 and 82 (above a threshold value). This modification would require simply that the energized state of contacts 71 and 72 be configured to cause expander 67 and compressor 65 to be switched onto signal paths 81 and 82. Further, it is considered obvious that the points on signal paths 81 and 82 to which frequency detectors 61a and 61b are coupled may alternatively include points on the local terminal side of compressor 65 and expander 67, as well as points on the channel side of compandor 62, with, at most, an adjustment of the threshold value for frequency detection. Additionally, although two tone detectors 61a and 61b are shown in FIG. 2, it is considered within the ability of one of reasonable skill in the art to employ but a single tone detector shared appropriately between signal paths 81 and 82 for the detection of supervisory tone signal on either of the paths.

The operation of the present invention as disclosed herein is described with relation to the functional depiction of FIG. 2. Whenever energy at 2600 Hz is present on signal lead 81, indicating the idle state of the WEST terminal or 2600 Hz is present on signal lead 82, indicating the idle state of the associated line in the EAST communications center, relay 70 causes its contacts 71 and 72 to couple amplifier 62 to lead 82 and to couple attenuator 64 to lead 81. That is, in the presence of idle state energy on either signal lead, the compressor and expander are disabled and signals transmitted into the channel are attenuated and signals received from the channel are amplified. When neither signal lead 81 or 82 carries 2600 Hz energy, the relay contacts 71 and 72 assume their other position, causing expander 67 to be coupled to lead 82 and compressor 65 to be coupled to lead 81. Thus, while the terminal at either end of the communications channel is in its idle state, the signal transmitted by the local terminal (WEST in the depiction of FIG. 2) to the remote communications center (EAST) are attenuated by typically 12 dB and the signals received from the remote terminal are amplified by the same typical 12 db. When both terminals are active (non-idle), compressor 65 and expander 67 are switched into the circuit to perform their respective functions during the voice transmission.

The timing charts of FIGS. 3 and 4 demonstrate that the inclusion of the apparatus of the present invention does not affect the characteristics of the signal received by the terminal equipment. Both figures show the relative signal power level at the relevant point along the signal paths of the communications system. FIG. 3 illustrates the signals of a typical call sequence absent the apparatus of the present invention, while FIG. 4 illustrates the signals of the same call sequence including the present invention. The letter callouts (a through h) of FIG. 2 indicate the points along the signal paths of the communications system which are used for the timing charts of FIGS. 3 and 4.

The following are the parameters of the system of the present example which are identical in both FIGS. 3 and 4:

(1) The compandor is a non-linear device which alters the signal level by an amount dependent on the absolute signal level;

(2) The signal level of the supervisory tone (2600 Hz) being transmitted from the terminal equipment is −20 dBmO (all signal levels are stated as relative values, i.e., dBmO units);

(3) Dial pulses are generated by the terminal equipment at −8 dBmO;

(4) Dial tone is generated by the terminal equipment at −10 dBmO;

(5) Ring back tone level is at −16 dBmO; and (6) End of call indication is generated by the terminal equipment at −8 dBmO.

Referring first to FIG. 3, the timing charts depict a call sequence not including the method or apparatus of the present invention. The WEST terminal is initially shown in its idle state; a −20 dBmO supervisory signal indicating such idle state is transmitted by the WEST terminal as shown in timing diagram (a). The timing diagram (b) shows a 6 dB attenuation through the compressor for the same idle state tone, timing diagram (c) shows the −26 dBmO idle state tone signal received at the EAST communications center, and in timing diagram (d) the signal is expanded to the −20 dBmO expected to be received at the EAST terminal. The offset between timing diagrams (b) and (c) indicates the time delay of the signal transmission from the WEST to the EAST communications centers. Similarly, timing diagrams (e), (f), (g), and (h) show the initial idle state condition of the EAST terminal, with its −20 dBmO idle state supervisory signal being sent by the EAST terminal, transmitted through the communications channel at −26 dBmO, and received at the WEST terminal at the expected level of −20 dBmO.

Referring back to timing diagram (a), the supervisory level drops to the ambient noise level as the WEST terminal goes off hook (becomes non-idle). The off hook condition is recognized in the EAST communications center and dial tone is added to its idle state supervisory tone and transmitted back toward the WEST terminal. It may be observed that the compression of a −10 dBmO signal in the present example is 11 dB, resulting in a −21 dBmO signal over the communications channel as shown.

Upon receipt of dial tone at the WEST terminal, the WEST subscriber transmits a series of dial pulses at −8 dBmO (see timing diagram (a)), transmitted between the communications centers at −20 dBmO due to compression (see timing diagrams (b) and (c)), and expanded to −8 dBmO for receipt by the EAST terminal (see timing diagram (d)). Note that the detection of the initial dial pulse by the EAST communications center causes the dial tone to be terminated leaving only the −20 dBmO supervisory tone (−26 dBmO on the communications channel between the centers) (see timing diagrams (e), (f), (g), and (h)).

Following dial pulsing, ringing occurs at the called (EAST) terminal and ring back tone is sent to the calling (WEST) terminal from the EAST communications center. Ring back tone is sent by the EAST terminal at −16 dBmO (see timing diagram (e)), compressed to −24 dBmO for transmission on the communications channel (see timing diagrams (f) and (g)), and expanded to −16 dBmO for receipt at the WEST terminal (see timing diagram (h)).

Ringing tone terminates when the called subscriber (EAST) goes off hook. At this point, the idle state supervisory tone transmitted by the EAST terminal also terminates. The call is thus established and normal communications occur. At the end of the communications, one of the subscribers, WEST in the present example, terminates the connection by going on hook. At this point, the idle state supervisory tone of −20 dBmO commences along with an end-of-call indication at −8 dBmO. This signal is propagated across to the EAST communications center at levels consistent with the dial pulsing described above. At the conclusion of the end-of-call indication, the −20 dBmO idle state supervisory tone continues to be transmitted by the WEST terminal. Similar levels are seen for the on-hook transition of the EAST terminal. In summary, it is seen that the idle state supervisory tone is terminated by each terminal as it goes off hook and resumes when the terminal goes on hook.

Referring now to FIG. 4, the identical call sequence is plotted including, however, the method of the present invention. It will be recalled that the present invention requires that the signal transmitted by each terminal be attenuated by a fixed level, typically 12 dB in the present example, and the signal received by each terminal from the other communications center be amplified by that same level, whenever the idle state supervisory tone is detected on either line. In the present example, this requirement compels a disabling of the companding function under this condition. Note that the tone levels of timing charts (b) and (f) of FIG. 4 are a fixed 12 dB below the respective levels of timing charts (a) and (e) and that the tone level of timing charts (d) and (h) of FIG. 4 are a fixed 12 dB above the respective levels of timing charts (c) and (g) at all times except when the subscribers are connected for communication.

The advantage of the present invention is demonstrated by comparing timing charts (b), (c), (f), and (g) between FIGS. 3 and 4. In the idle state (extreme left and extreme right of the timing charts), the present invention reduces the idle state supervisory tone from that of the present practice of using a compandor by an additional 6 dB (from −26 dBmO to −32 dBmO). Because, as stated earlier, idle state represents a significant portion of telephone channel usage, this 6 dB reduction represents a significant decrease in the total energy of the composite baseband signal.

As a confirmation that the present invention operates within the system described for the example, it will be shown that two required conditions are met: (1) The levels of the signal received by each terminal must be substantially undisturbed as a result of inclusion of the present invention, and (2) the signaling levels on the communications channel must not be significantly different for the methods depicted in FIGS. 3 and 4. Addressing the first condition, it can be easily seen that for signals shown in timing diagram (a) and (e) which are identically generated between the systems of FIGS. 3 and 4, the signals received by the terminals shown in timing diagrams (d) and (h) are substantially identical as between FIGS. 3 and 4. As to the second condition, a comparison of the signal levels on the communications channel between FIGS. 3 and 4 indicates that the signal levels are not significantly different. It is seen that the levels of dial pulses and on hook signaling carried between the centers, the level of dial tone sent by the communications center of the called terminal, and the level of ring back tone sent by the called center are either the same or not substantially different between the two figures. The differences, ranging up to a few dB, are acceptable in a system of this type, which typically provides a margin in excess of 20 dB for the signaling requirement, ensuring that there will be no difficulty in handling a signaling tone reduced by only a few dB.

Despite the seeming limitations in the language of this example to subscriber-to-subscriber connections, this form of interconnection would apply equally to trunk connections, connections including data devices, etc. Terms such as "on hook", "off hook", and "dial pulses" merely establish bases for recognizing the stages of a call, where these stages have elements common in all types of telephone interconnect.

Although most of the existing terrestrial microwave and satellite transmission systems for telephone voice channels use frequency modulated (FM) carriers, single-sideband amplitude modulation (SSB-AM) is known to be the most efficient in conserving bandwidth, and it is considered within the ability of one skilled in the art to apply teachings of the present invention to this, as well as other, modulation schemes.

The discussion in connection with FIG. 2 describes the invention from a functional standpoint. In practice, many commercially available compandors, such as Model 937, sold by Coastcom, Inc., Concord, Calif., for example, include a "disable" function which, when activated, switches the compressor and expander out of the signal paths, replacing them, respectively, with a fixed level attenuator and a fixed gain amplifier, where the attenuation level and the gain may typically be 12 dB as used in the example herein.

FIG. 5 illustrates such a compandor within an embodiment of the present invention. Terminal equipment 100 transmits on signal lead 101 and receives on signal lead 102. Compandor 103 is of the type described above including an input for disabling the companding function. Tone detectors 104 and 105 monitor signal leads 101 and 102, respectively, for a single frequency tone indicating idle state. The output of tone detectors 104 and 105 are combined on signal lead 106 such that when an idle state tone is detected on either signal path 101 or 102, compandor 103 will be disabled, thereby attenuating by a fixed level the signal on lead 101 being transmitted into the communications channel and amplifying with a fixed gain the signal received from the communications channel to be applied to terminal 100 via signal lead 102.

A further embodiment of the present invention is illustrated in FIG. 6. In communications system of the type described herein it is conventional practice to employ echo cancellers which typically include a plurality of tone detectors used for traffic monitoring. One such echo canceller is, for example, Model EC 4000, sold by COMSAT General TeleSystems, Inc., Fairfax, Va. FIG. 6 shows the present invention including tone detectors 115 and 116, packaged integrally within echo canceller 114, coupled, respectively, to signal leads 111 and 112. Tone detectors 115 and 116 are but two of the tone detectors included within echo cancellor 114, which may further include, for example, tone detectors 117 and 118. Tone detectors 115 and 116 monitor signal lines 111 and 112 for the presence of the single frequency tone indicating idle state. When that tone is detected on either line 111 or 112, a control signal is applied to signal lead 119 which causes compandor 113 to be disabled, as per the discussion in relation to FIG. 5.

Thus, it can be seen that the method of the present invention may be utilized by employing compandors and echo cancellers which are conventional equipment in many telephone communications systems and thereby effect the reduction of the channel power loading. The embodiments described in the foregoing specification are meant to serve merely as examples and the invention is not to be construed as limited by them, but rather the scope of the invention is to be found in the following claims, which will encompass those modifications and variations which would be obvious to one skilled in the relevant art.

What is claimed is:

1. In a communications system used for the transmission of signals between two terminals via a communications channel, wherein a supervisory signal of predetermined frequency and predetermined power level is transmitted by each of said terminals into said communications channel when said terminal is idle, an apparatus for reducing the power loading in said system due to said supervisory signals comprising:
   means individually associated with each of said two terminals for providing a control signal in response to said supervisory signal transmitted by said associated terminal into said communications channel or received by said associated terminal from said communications channel; and
   means responsive to a first level of said control signal for compressing the signal transmitted by said associated terminal into said communications channel and expanding the signal received by said associated terminal from said communications channel, wherein the power ratios of said compression and said expansion are related to said transmitted signal and said received signal, respectively, and responsive to a second level of said control signal for attenuating the signal transmitted by said associated terminal into said communications channel by a predetermined power ratio and amplifying the signal received by said associated terminal from said communications channel by the predetermined power ratio of said attenuation.

2. The apparatus according to claim 1 wherein said means for providing a control signal is a supervisory signal tone detector.

3. The apparatus according to claim 1 wherein said second-mentioned means attenuates said supervisory signal in response to said second level of said control signal to a greater extent than said second-mentioned means compresses said supervisory signal in response to said first level of said control signal, and wherein said second-mentioned means amplifies said supervisory signal in response to said second level of said control signal to a greater extent than said second-mentioned means expands said supervisory signal in response to said first level of said control signal.

4. The apparatus of claim 1 wherein said communications channel includes a communications satellite.

5. In a communications system used for the transmission of signals between two terminals via a communications channel, wherein a supervisory signal of predetermined frequency and predetermined power level is transmitted by each of said terminals into said communications channel when said terminal is idle, a method for reducing the power loading in said system due to said supervisory signals comprising the steps of:

generating a control signal at each of said two terminals in response to said supervisory signal transmitted by the associated terminal into said communications channel or received by the associated terminal from said communications channel;

compressing the signal transmitted by the associated terminal into said communications channel in response to a first level of said control signal and expanding the signal received by the associated terminal from said communications channel in response to said first level of said control signal, wherein the power ratios of compression and expansion are related to said transmitted signal and received signal, respectively; and attenuating the signal transmitted by the associated terminal into said communications channel by a predetermined power ratio in response to a second level of said control signal and amplifying the signal received by the associated terminal from said communications channel by the predetermined power ratio of said attenuation in response to said second level of said control signal.

* * * * *